(12) United States Patent
Sasaki et al.

(10) Patent No.: US 7,448,569 B2
(45) Date of Patent: Nov. 11, 2008

(54) CARTRIDGE CASE AND INFORMATION RECORDING MEDIUM

(75) Inventors: Morimasa Sasaki, Tokyo (JP); Takateru Satoh, Tokyo (JP)

(73) Assignee: TDK Corporation, Tokyo (JP)

( * ) Notice: Subject to any disclaimer, the term of this patent is extended or adjusted under 35 U.S.C. 154(b) by 440 days.

(21) Appl. No.: 11/138,276

(22) Filed: May 27, 2005

(65) Prior Publication Data

US 2005/0263638 A1  Dec. 1, 2005

(30) Foreign Application Priority Data

May 31, 2004  (JP) .............................. 2004-161286

(51) Int. Cl.
 *G11B 23/04* (2006.01)
(52) U.S. Cl. .................... 242/338.1; 242/343
(58) Field of Classification Search ................ 242/343, 242/348, 348.2, 338, 338.1; 360/132
See application file for complete search history.

(56) References Cited

U.S. PATENT DOCUMENTS

| 6,651,917 | B2 | 11/2003 | Momoi et al. |
| 7,258,295 | B2 * | 8/2007 | Satoh .......................... 242/348 |

FOREIGN PATENT DOCUMENTS

| JP | 11-185437 | 7/1999 |
| JP | 11-288571 | 10/1999 |
| JP | 2002-319266 | 10/2002 |
| JP | 2002-343058 | 11/2002 |
| JP | 2004-046993 | 2/2004 |
| JP | 2004-118884 | 4/2004 |
| JP | 2004-127358 | 4/2004 |

OTHER PUBLICATIONS

English Language Abstract of JP 2004-046993.
English Language Abstract of JP 11-288571.
English language Abstract of JP 2004-118884.
English language Abstract of JP 11-185437.
English language Abstract of JP 2004-127358.
English language Abstract of JP 2002-343058.
English language Abstract of JP 2002-319266.
U.S. Appl. No. 11/042,174 to Satoh, which was filed on Jan. 26, 2005.
Japanese Patent Publication No. JP 2002-343058 A, together with an English language computer-generated translation.

* cited by examiner

*Primary Examiner*—William A Rivera
(74) *Attorney, Agent, or Firm*—Greenblum & Bernstein, P.L.C.

(57) ABSTRACT

A cartridge case includes a case main body, a tape reel having a hub including a first teeth portion and accommodated in the case main body, and a lock member including a second teeth portion engaged with the first teeth portion, wherein the lock member includes at least one of an inner peripheral projection formed to an inner peripheral side of the second teeth portion, projecting toward the bottom plate beyond the second teeth portion, and engaged with the tape reel on the inner peripheral side of the first teeth portion when the first teeth portion is engaged with the second teeth portion and an outer peripheral projection formed to the outer peripheral side of the second teeth portion, projecting toward the bottom plate beyond the second teeth portion, and engaged with the tape reel on the outer peripheral side of the first teeth portion in the above engaged state, thereby the tape reel can be securely locked without loosening a magnetic tape.

4 Claims, 9 Drawing Sheets

F I G. 1
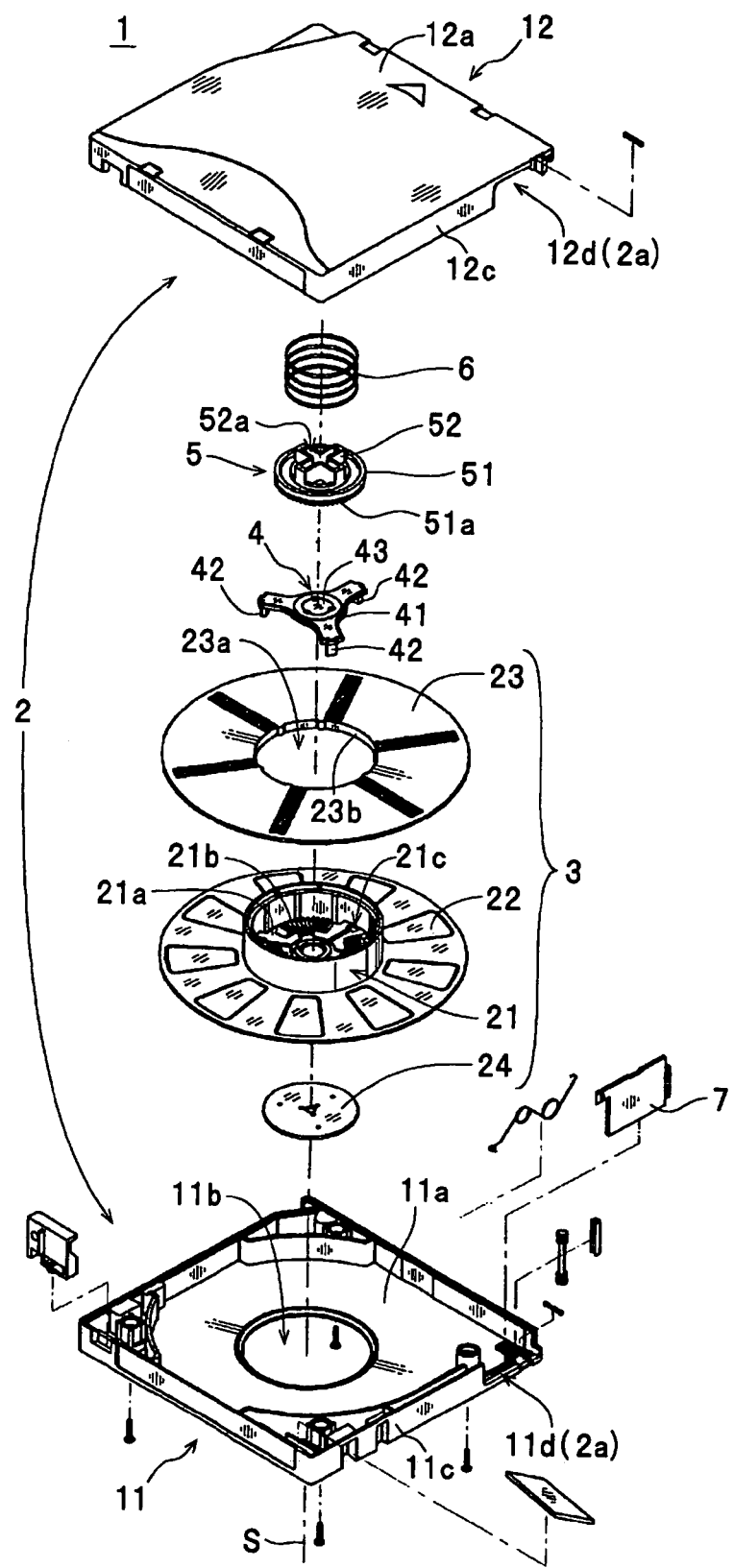

CARTRIDGE CASE AND INFORMATION RECORDING MEDIUM

BACKGROUND OF THE INVENTION

1. Field of the Invention

The present invention relates to a cartridge case having a tape reel including a cylindrical bottomed hub, a lock member for stopping the rotation of the tape reel, and to an information recording medium having the cartridge case.

2. Description of the Related Art

Heretofore, there is known a single reel type tape cartridge having a single tape reel accommodated in a case main body as an information recording medium capable of recording a large amount of data. In this type of the tape cartridge, when the tape cartridge is mounted on a drive unit, a magnetic tape can be wound by rotating the tape reel by engaging a drive teeth portion formed to an outside surface of a bottom plate of a hub of the tape reel with a drive teeth portion formed to a drive shaft of the drive unit. Further, when this type of the tape cartridge is not used, the rotation of the tape reel can be stopped by engaging a locking teeth portion formed on an inside surface of the bottom plate of the hub of the tape reel with a locking teeth portion formed to a lock member in the case main body. In this case, to rotate the tape reel smoothly, a predetermined clearance must be provided between the tape reel and the case main body. Accordingly, in this type of the tape cartridge, since the tape reel shifts in the case main body by the amount of the clearance, the tape reel may be decentered (misaligned) from the drive shaft of the drive unit, and thus the drive teeth portions thereof may not be perfectly engaged with each other, from which a problem arises in that it is difficult to wind the magnetic tape in such a case. Further, since the tape reel shifts in the case main body, the tape reel is decentered from the lock member, and thus the locking teeth portions thereof may not be completely engaged with each other, from which a problem also arises in that the tape reel may be imperfectly locked and the magnetic tape wound around the tape reel may be loosened in such a case.

As a technology capable of solving the above problems, Japanese Laid-Open Patent Publication No. 2002-343058 discloses a magnetic tape cartridge having a rib formed on an inner peripheral surface of a reel hub (hub) of a reel (tape reel). In the magnetic tape cartridge, the clearance between the end of the rib and an outer peripheral surface of a lock member is reduced in a locked state in which the locking teeth of the lock member is engaged with the locking teeth of the reel. As a result, even if the magnetic tape cartridge is set to the drive unit in, for example, a longitudinally mounting state (the axial line of the reel is in an approximately horizontal state), since the rib is abutted against the outer periphery of the lock member, the shift of the lock member and the reel locked by the lock member is regulated. Accordingly, the reel is prevented from being decentered from a rotational drive member (drive shaft) of the drive unit, and the reel is prevented from being decentered from the lock member, thereby respective tooth (gears) can be securely engaged with each other.

SUMMARY OF THE INVENTION

As a result of examination of the above magnetic tape cartridge, the inventors have found the following problems. That is, the magnetic tape cartridge regulates the shift of the reel by reducing the clearance between the end of the rib disposed on the inner peripheral surface of the reel hub and the outer peripheral surface of the lock member. In contrast, the reel hub (reel) is ordinarily made by injection molding resin. In this case, since the portion of the reel hub where the rib is formed is thicker than the other portions, irregularities may be formed on the outer peripheral surface of the reel hub by the shrinkage occurred in the injection molding, and when a magnetic tape is wound around reel hub on which the irregularities are made, the magnetic tape may be partially deformed. Accordingly, the magnetic tape cartridge is defective in that data cannot be smoothly recorded and reproduced due to the deformation of the magnetic tape.

A leading object of the present invention, which was made in view of the above problems, is to provide a cartridge case capable of securely locking a tape reel without deforming a magnetic tape, and an information recording medium having the cartridge case.

To achieve the above object, a cartridge case according to the present invention includes a case main body, a tape reel having a cylindrical bottomed hub, which includes a first teeth portion formed to the inner surface of the bottom plate thereof in an annular or arc shape when viewed in a plane, and rotatably accommodated in the case main body, and a lock member including a second teeth portion, which is formed on the bottom portion thereof in an annular shape when viewed in a plane and is engaged with the first teeth portion, and accommodated in the case main body so as to be urged to the bottom plate and to move along a direction where it becomes close to and separates from the bottom plate to thereby restrain the rotation of the tape reel, wherein the lock member includes at least one of an inner peripheral projection, which is formed to the inner peripheral side of the second teeth portion, projects toward the bottom plate beyond the teeth tip of the second teeth portion, and is engaged with the tape reel on the inner peripheral side of the first teeth portion when the first teeth portion is engaged with the second teeth portion, and an outer peripheral projection which is formed to the outer peripheral side of the second teeth portion, projects toward the bottom plate beyond the teeth tip of the second teeth portion, and is engaged with the tape reel on the outer peripheral side of the first teeth portion in the above engaged state. Further, the information recording medium according to the present invention has the cartridge case.

In the cartridge case and the information recording medium, the lock member includes at least one of the inner peripheral projection engaged with the tape reel on the inner peripheral side of the first teeth portion and the outer peripheral projection engaged with the tape reel on the outer peripheral side of the first teeth portion. Accordingly, when the first teeth portion is engaged with the second teeth portion, since the tape reel and the lock member can be securely positioned, the first teeth portion can be securely engaged with the second teeth portion. Further, when the tape cartridge is not used, since the relative misalignment between the tape reel and the lock member can be securely prevented, even if external force is applied to, for example, the cartridge case (information recording medium), the first teeth portion and the second teeth portion can be kept in a securely engaged state. Further, no rib is formed on the inner peripheral surface of the hub, when the hub (tape reel) is made by, for example, injection molding, the outer peripheral surface thereof can be smoothly formed without causing irregularities due to shrinkage. Accordingly, the rotation of the tape reel can be securely stopped without deforming a magnetic tape by the irregularities on the outer peripheral surface of the hub.

In this case, at least one of the projections may be formed such that the surface thereof confronting a inner side surface on an outer side surface of the first teeth portion gradually separates from the side surface toward the end of the surface in the engaged state. With the above arrangement, when the lock member is moved toward the bottom surface of the hub, even if, for example, the tape reel is decentered from the lock member, the lock member can smoothly guide the inner peripheral projection and the outer peripheral projection to an engaging position by the surface of the end portion thereof. Accordingly, it can be securely prevented that the end portions of the inner peripheral projection and the outer peripheral projection are collided against the teeth tip of the first teeth portion and both of them are broken.

Further, the lock member may be composed of only the inner peripheral projection out of the inner and outer peripheral projections. With this arrangement, even if, for example, the lock member inclines with respect to the tape reel, since inner peripheral projection is unlike to come into contact with the teeth tip of the first teeth portion of the tape reel, noise, which is caused by the inner peripheral projection in contact with the teeth tip of the first teeth portion, and the wear of them can be securely prevented.

Further, a cartridge case according to the present invention includes a case main body, a tape reel having a cylindrical bottomed hub, which includes a first teeth portion formed to the inner surface of the bottom plate thereof in an annular or arc shape when viewed in a plane, and rotatably accommodated in the case main body, and a lock member including a second teeth portion, which is formed on the bottom portion thereof in an annular shape when viewed in a plane and is engaged with the first teeth portion, and accommodated in the case main body so as to be urged to the bottom plate and to move along a direction where it becomes close to and separates from the bottom plate to thereby restrain the rotation of the tape reel, wherein the tape reel includes at least one of an inner peripheral projection, which is formed to the inner peripheral side of the first teeth portion, projects toward the opening of the hub beyond the teeth tip of the first teeth portion, and is engaged with the lock member on the inner peripheral side of the second teeth portion in the engaged state of the first teeth portion with the second teeth portion, and an outer peripheral projection which is formed on the outer peripheral side of the first teeth portion, projects toward the opening of the hub beyond the teeth tip of the first teeth portion, and is engaged with the lock member on the outer peripheral side of the second teeth portion in the above engaged state. Further, the information recording medium according to the present invention has the cartridge case.

In the cartridge case and the information recording medium according to the present invention, the tape reel includes at least one of an inner peripheral projection engaged with the lock member on the inner peripheral side of the second teeth portion and an outer peripheral projection engaged with the lock member on the outer peripheral side of the second teeth portion. Accordingly, when the first teeth portion is engaged with the second teeth portion, since the tape reel and the lock member can be securely positioned, the first teeth portion can be securely engaged with the second teeth portion. Further, when the tape cartridge is not used, since the relative misalignment between the tape reel and the lock member can be securely prevented, even if external force is applied to, for example, the cartridge case (information recording medium), the first teeth portion and the second teeth portion can be kept in a securely engaged state. Further, no rib is formed on the inner peripheral surface of the hub, when the hub is made by, for example, injection molding, the outer peripheral surface thereof can be smoothly formed without causing irregularities due to shrinkage. Accordingly, the rotation of the tape reel can be securely stopped without deforming a magnetic tape by the irregularities on the outer peripheral surface of the hub.

In this case, at least one of the projections may be formed such that the surface thereof confronting any of the inner peripheral side surface and the outer peripheral side surface of the second teeth portion of the lock member gradually separates from the side surface toward the end of the surface in the above engaged state. With the above arrangement, when the lock member is moved toward the bottom surface of the hub, even if, for example, the tape reel is decentered from the lock member, the lock member can smoothly guide the inner peripheral projection and the outer peripheral projection to an engaging position by the surface of the end portion thereof. Accordingly, it can be securely prevented that the end portions of the inner peripheral projection and the outer peripheral projection are collided against the teeth tip of the second teeth portion and both of them are broken.

Further, a cartridge case according to the present invention includes a case main body, a tape reel having a cylindrical bottomed hub, which includes a first teeth portion formed to the inner surface of the bottom plate thereof in an annular or arc shape when viewed in a plane, and rotatably accommodated in the case main body, and a lock member including a second teeth portion, which is formed on the bottom portion thereof in an annular shape when viewed in a plane and is engaged with the first teeth portion, and accommodated in the case main body so as to be urged to the bottom plate and to move along a direction where it becomes close to and separates from the bottom plate to thereby restrain the rotation of the tape reel, wherein the tape reel includes an outer peripheral projection which is formed to the outer peripheral side of the first teeth portion, projects toward the opening of the hub beyond the teeth tip of the first teeth portion, and is engaged with the lock member on the outer peripheral side of the second teeth portion in the engaged state of the first teeth portion with the second teeth portion, and the lock member includes an inner peripheral projection which is formed to the inner peripheral side of the second teeth portion, projects toward the bottom plate beyond the teeth tip of the second teeth portion, and is engaged with the tape reel on the inner peripheral side of the first teeth portion in the above engaged state. Further, the information recording medium according to the present invention has the cartridge case.

In the cartridge case and the information recording medium, the tape reel includes the outer peripheral projection engaged with the lock member on the outer peripheral side of the second teeth portion, and the lock member includes the inner peripheral projection engaged with the tape reel on the inner peripheral side of the first teeth portion. Accordingly, the tape reel and the lock member can be more securely positioned. The relative misalignment between the tape reel and the lock member can be more securely prevented. Further, since no rib is formed on the inner peripheral surface of the hub, the outer peripheral surface thereof can be smoothly formed without causing irregularities due to shrinkage. Accordingly, the rotation of the tape reel can be more securely stopped without deforming a magnetic tape by the irregularities on the outer peripheral surface of the hub.

In this case, the outer peripheral projection may be formed such that the surface thereof confronting the outer peripheral side surface of the second teeth portion of the lock member gradually separates from the side surface toward the end of the surface in the above engaged state as well as the inner peripheral projection may be formed such that the surface thereof confronting the inner peripheral side surface of the first teeth portion gradually separates from the side surface toward the end of the surface in the engaged state. With this arrangement, even if, for example, the tape reel is decentered from the lock member, since the outer peripheral projection and the inner peripheral projection can be smoothly guided to an engaging position, the breakage of the outer peripheral projection and the teeth tip of the second teeth portion caused by the collision therebetween and the breakage of the inner peripheral projection and the teeth tip of the first teeth portion caused by the collision therebetween can be securely prevented.

Further, a cartridge case according to the present invention includes a case main body, a tape reel having a cylindrical bottomed hub, which includes a first teeth portion formed to the inner surface of the bottom plate thereof in an annular or arc shape when viewed in a plane, and rotatably accommodated in the case main body, and a lock member including a second teeth portion, which is formed on the bottom portion thereof in an annular shape when viewed in a plane and is engaged with the first teeth portion, and accommodated in the case main body so as to be urged to the bottom plate and to move along a direction where it becomes close to and separates from the bottom plate to thereby restrain the rotation of the tape reel, wherein the tape reel includes an inner peripheral projection which is formed to the inner peripheral side of the first teeth portion, projects toward the opening of the hub beyond the teeth tip of the first teeth portion, and is engaged with the lock member on the inner peripheral side of the second teeth portion in the engaged state of the first teeth portion with the second teeth portion, and the lock member includes an outer peripheral projection which is formed to the inner peripheral side of the second teeth portion, projects toward the bottom plate beyond the teeth tip of the second teeth portion, and is engaged with the tape reel on the outer peripheral side of the first teeth portion in the above engaged state. Further, the information recording medium according to the present invention has the cartridge case.

In the cartridge case and the information recording medium, the tape reel includes the inner peripheral projection engaged with the lock member on the inner peripheral side of the second teeth portion, and the lock member includes the outer peripheral projection engaged with the tape reel on the outer peripheral side of the first teeth portion. Accordingly, the tape reel and the lock member can be more securely positioned. The relative misalignment between the tape reel and the lock member can be more securely prevented. Further, since no rib is formed on the inner peripheral surface of the hub, the outer peripheral surface thereof can be smoothly formed without causing irregularities due to shrinkage. Accordingly, the rotation of the tape reel can be more securely stopped without deforming a magnetic tape by the irregularities on the outer peripheral surface of the hub.

In this case, the inner peripheral projection may be formed such that the surface thereof confronting the inner peripheral side surface of the second teeth portion of the lock member gradually separates from the side surface toward the end of the surface in the above engaged state, and the outer peripheral projection may be formed such that the surface thereof confronting the outer peripheral side surface of the first teeth portion gradually separates from the side surface toward the end of the surface in the engaged state. With this arrangement, even if, for example, the tape reel is decentered from the lock member, since the inner peripheral projection and the outer peripheral projection can be smoothly guided to an engaging position, the breakage of the inner peripheral projection and the second teeth portion caused by the collision therebetween and the breakage of the outer peripheral projection and the first teeth portion caused by the collision therebetween can be securely prevented.

It should be noted that the above disclosure relates to the subject contained in Japanese Patent Application No. 2004-161286 filed on May 31, 2004, which is hereby entirely incorporated explicitly as reference.

BRIEF DESCRIPTION OF THE DRAWINGS

These and other objects and features of the present invention will be explained in more detail below with reference to the attached drawings, wherein:

FIG. 1 is an exploded perspective view of a tape cartridge.

DESCRIPTION OF THE PREFERRED EMBODIMENTS

Figure 2:
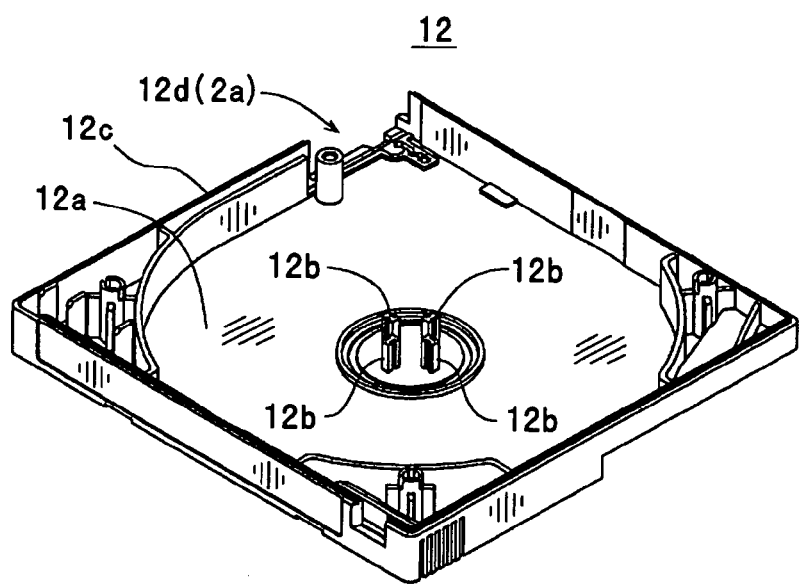
FIG. 2 is a perspective view of an upper case.

Preferred embodiments of a cartridge case and an information recording medium according to the present invention will be explained with reference to the accompanying drawings.

First, the arrangement of a tape cartridge 1 (an example of an information recording medium according to the present invention) will be explained with reference to the drawings.

The tape cartridge 1 shown in FIG. 1 is a single reel type cartridge information recording medium based on LTO (Linear Tape Open) standard used as a storage device to back up data recorded in, for example, a computer. As shown in FIG. 1, the tape cartridge 1 is composed of a case main body 2, a tape reel 3, a brake elimination plate 4, a lock member 5, a spring 6, and a door member 7, and a magnetic tape (not shown) is wound around the tape reel 3. In this case, the cartridge case according to the present invention is composed of the respective components excluding the magnetic tape.

As shown in FIG. 1, the case main body 2 is composed of a lower case 11 and an upper case 12 each of which is formed in a shallow plate shape and which can be engaged with each other, and the tape reel 3 is rotatably accommodated in the internal space formed by both the cases 11 and 12 engaged with each other. In this case, the lower case 11 has a bottom plate 11a including a circular opening 11b formed at the center thereof so that a drive shaft of a drive unit (not shown) can be inserted therethrough. Further, the lower case 11 has a side wall 11c including a cutout 11d formed thereto which constitutes a tape drawing-out port 2a for drawing out the magnetic tape wound around the tape reel 3 to the outside. In contrast, as shown in FIG. 2, the upper case 12 has a top plate 12a including four guide projections 12b, 12b, . . . formed at the center of the inner surface thereof. The guide projections 12b, 12b, . . . regulate the rotation of the lock member 5 as well as vertically movably hold (vertically guide) the lock member 5. Further, the upper case 12 has a side wall 12c including a cutout 12d formed thereto. The drawing-out port 2a is formed by the cutout 12d combined with the cutout 11d of the lower case 11.

Figure 3:
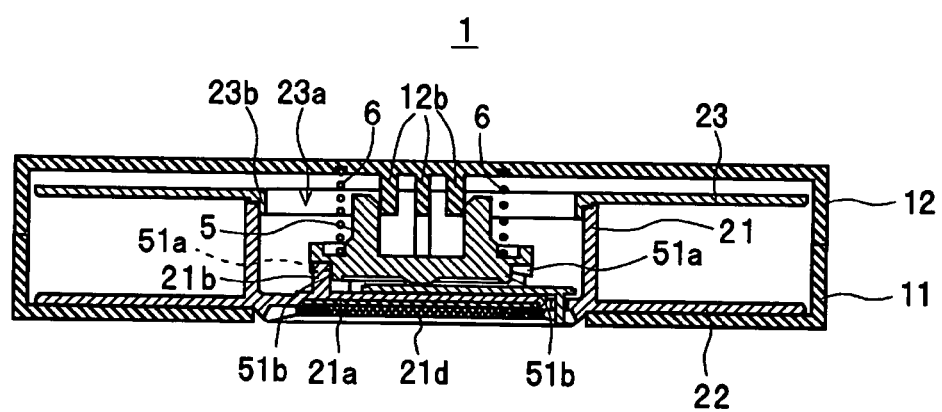
FIG. 3 is a cross-sectional view of the tape cartridge.
Figure 4:
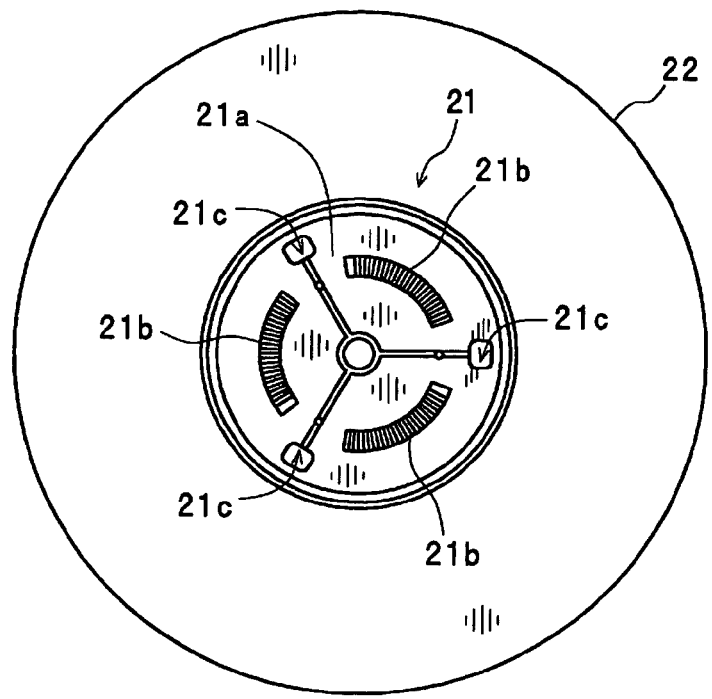
FIG. 4 is a plan view of a hub and a lower flange.
Figure 5:
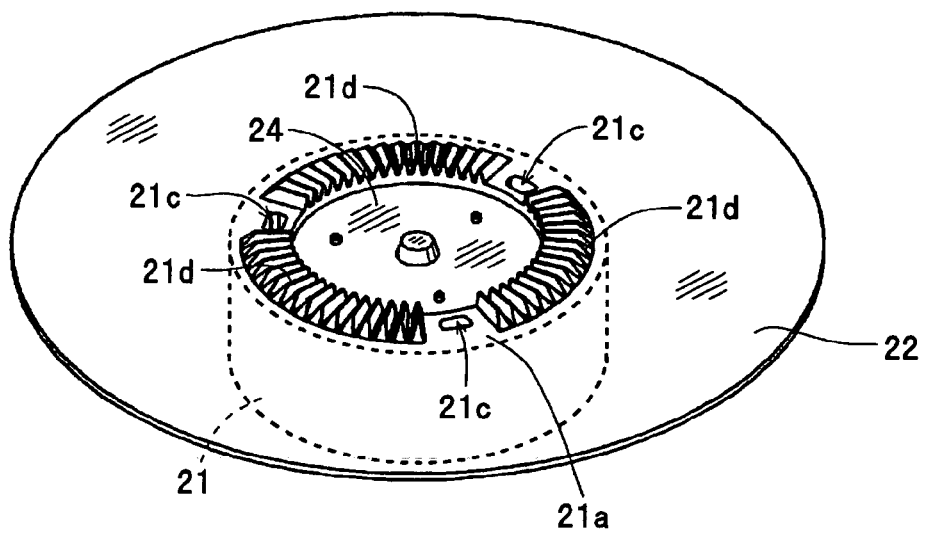
FIG. 5 is a perspective view of the hub and the lower flange.

As shown in FIG. 1, the tape reel 3 has a hub 21, a lower flange 22, and an upper flange 23. The hub 21 is formed in a bottomed cylindrical shape including an opening formed to an upper end, and the magnetic tape can be wound around the periphery of the hub 21. As shown in FIGS. 3 and 4, the hub 21 has a bottom plate 21a, and teeth portions 21b, 21b, and 21b (corresponding to a first teeth portion of the present invention), each of which has an arc shape when viewed in a plane and is respectively engaged with a teeth portion 51a the lock member 5 urged by the spring 6, are formed on the inner surface of the bottom plate 21a of the hub 21 such that they are located on the same circumference whose center is in coincidence with the axial line of the hub 21. As shown in FIG. 4, the bottom plate 21a of the hub 21 includes insertion holes 21c, 21c, and 21c formed thereto such that they are located on the same circumference whose center is in coincidence with the axial line of the hub 21, and the brake elimination plate 4 (refer to FIG. 1) is vertically movably attached through the insertion holes 21c, 21c, and 21c. As shown in FIG. 5, the hub 21 has a metal plate 24 (also refer to FIG. 1) attached to the center of the outside surface of the bottom plate 21a, and the metal plate 24 attracts the drive shaft of the drive unit and the hub 21 (tape reel 3) by magnetic force. Further, as shown in FIG. 5, annular teeth portions 21d, 21d, and 21d are formed on the outside surface of the bottom plate 21a so as to surround the metal plate 24 and engaged with the drive teeth portion (not shown) of the drive shaft of the drive unit.

As shown in FIGS. 4 and 5, the lower flange 22 is formed to the lower end of the hub 21 formed in a disc shape integrally therewith. As shown in FIGS. 1 and 3, the upper flange 23 is formed in a disc shape, has a circular center hole 23a and an annular projection 23b formed around the opening edge of the center hole 23a, and fixed to the hub 21 by being subjected to, for example, ultrasonic welding in the state that the annular projection 23b is inserted into the opening of the hub 21.

As shown in FIG. 1, the brake elimination plate 4 is composed of a main body portion 41, three leg portions 42, 42, and 42 standing on the back surface (lower surface in FIG. 1) of the main body portion 41 so as to be inserted into the insertion holes 21c, 21c, and 21c of the hub 21, and a circular metal plate 43 attached to the center of the front surface (upper surface in FIG. 1) of the main body portion 41. In this case, since the leg portions 42, 42, and 42 are inserted into the insertion holes 21c, 21c, and 21c of the hub 21, respectively, the brake elimination plate 4 is disposed to the bottom plate 21a internally of the hub 21 so that it cannot be relatively rotated with respect to the hub 21 and can be moved vertically.

Figure 6:
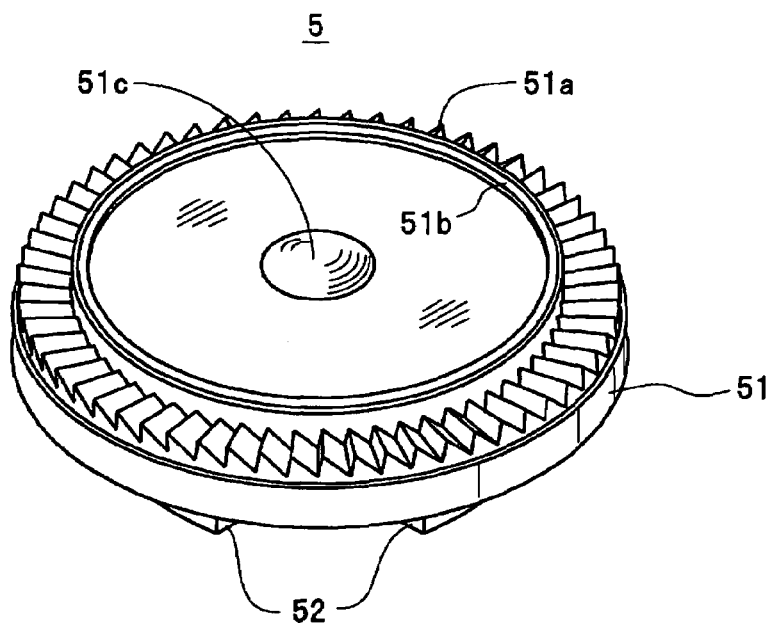
FIG. 6 is a perspective view of a lock member.
Figure 7:
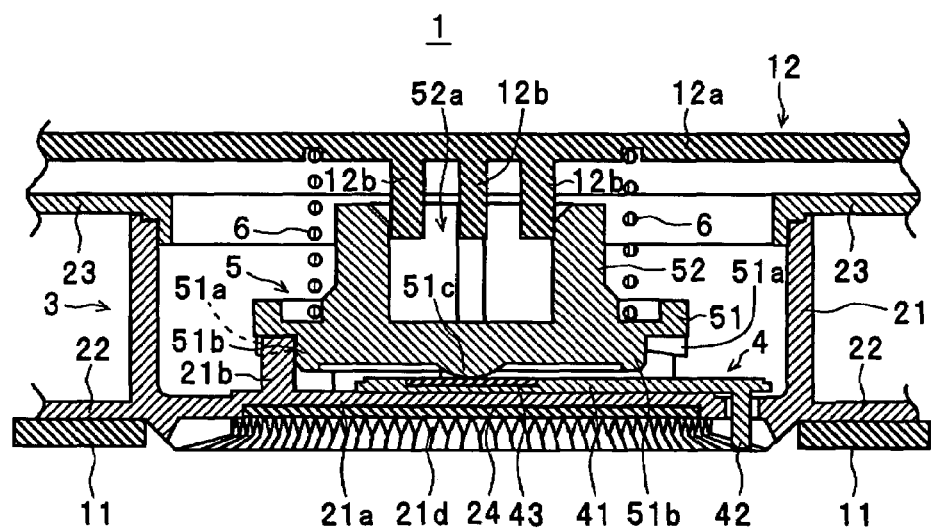
FIG. 7 is a cross-sectional view of the tape cartridge when it is not used.
Figure 9:
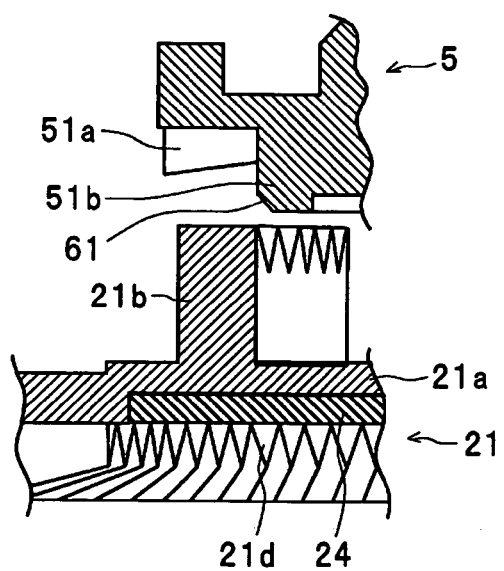
FIG. 9 is a cross-sectional view of main portions of the lock member and the hub.

As shown in FIG. 1, the lock member 5 is composed of a main body 51 and a guide portion 52 and accommodated in the case main body 2 (in the hub 21). The main body 51 is formed in a circular shape, and, as shown in FIG. 6, the main body 51 has a teeth portion 51a (corresponding to a second teeth portion in the present invention) formed on the outer edge of the bottom surface (upper surface in FIG. 6) thereof. The teeth portion 51a has an annular shape when viewed in a plane and can be engaged with the teeth portions 21b of the hub 21. Further, the teeth portion 51a of the main body 51 has an annular positioning projection 51b formed on the inner peripheral surface thereof (corresponding to an inner peripheral projection formed on the inner peripheral surface of the second teeth portion of the present invention). In this case, the positioning projection 51b has a projecting length prescribed longer than the teeth height of the teeth portion 51a. That is, as shown in FIG. 7, when the teeth portions 21b of the hub 21 is engaged with the teeth portion 51a, the positioning projection 51b is prescribed to project toward the bottom plate 21a of the hub 21 beyond the teeth tip of the teeth portion 51a. Further, the outside diameter of the positioning projection 51b is prescribed such that it is engaged with the tape reel 3 on an inner peripheral side of the teeth portions 21b, 21b, and 21b when the teeth portions 21b are engaged with the teeth portion 51a. Further, as shown in FIG. 9, the sectional shape of the positioning projection 51b at the end portion thereof is formed of an inclining surface 61 having a linear sectional shape so that the outer peripheral surface (surface confronting a side surface of the first teeth portion of the present invention) at the end portion of the positioning projection 51b is gradually separated from the side surfaces (inner peripheral sides) of the teeth portions 21b toward the end of the positioning projection 51b. In this case, the end portion of the positioning projection 51b is not limited to the linear sectional shape, and the inclining surface 61 may be formed of a curved sectional shape or a sectional shape formed by combining a curve and a straight line. Further, as shown in FIGS. 6 and 7, a projection 51c is formed at the center of the bottom surface of the main body 51. When the tape reel 3 is rotated, the projection 51c is abutted against the metal plate 43 of the brake elimination plate 4 to reduce the friction resistance between the metal plate 43 and the tape reel 3.

As shown in FIG. 1, the guide portion 52 is formed in a cross shape when viewed in a plane as well as has a guide groove 52a formed thereto. The guide groove 52a has a cross shape when viewed in a plane, and the four guide projections 12b, 12b, . . . of the upper case 12 can be inserted thereinto. When the tape cartridge 1 is not used, the rotation of the lock member 5 is regulated by the guide projections 12b, 12b, . . . of the upper case 12 as well as the lock member 5 is urged by the spring 6, thereby the teeth portion 51a thereof is engaged with the teeth portions 21b, 21b, and 21b of the hub 21 to thereby restrain the rotation of the tape reel 3.

As shown in FIG. 1, the spring 6 is composed of a coil spring, interposed between the upper case 12 and the lock member 5, and urges the lock member 5 against the bottom plate 21a of the hub 21 of the tape reel 3. As shown in FIG. 1, the door member 7 is formed in a thin plate shape so that it can close the tape drawing-out port 2a and accommodated in the tape cartridge 1 so as to be capable of sliding along guide grooves formed to the side wall 11c of the lower case 11 and the side wall 12c of the upper case 12, respectively.

Next, the operations of the respective components when the tape cartridge 1 is used will be explained with reference to the drawings.

When the tape cartridge 1 taken out from the drive unit (not shown), that is, when it is not used, the lock member 5 is urged by the spring 6 and moved to the bottom plate 21a of the hub 21 while pressing the brake elimination plate 4 as shown in FIG. 7. At the time, the teeth portion 51a of the lock member 5 is engaged with the teeth portions 21b of the hub 21. Further, the rotation of the lock member is regulated by the guide projections 12b, 12b, . . . of the upper case 12 inserted into the guide groove 52a of the guide portion 52. Accordingly, the rotation of the hub 21 (tape reel 3) is stopped by the lock member 5 and the guide projections 12b, 12b, . . . . As a result, the magnetic tape (not shown) wound around the tape reel 3 is prevented from being loosened. Further, in this state, as shown in FIG. 7, the positioning projection 51b of the lock member 5 is engaged with the tape reel 3 on the inner peripheral side of the teeth portions 21b, 21b, and 21b. Accordingly, since the relative movement of the hub 21 is regulated with respect to the lock member 5 along a surface direction perpendicular to the axial line S of the hub 21 (refer to FIG. 1), even if external force is applied to, for example, the tape cartridge 1, the teeth portions 21b and the teeth portion 51a can be kept in a securely engaged state.

Figure 8:
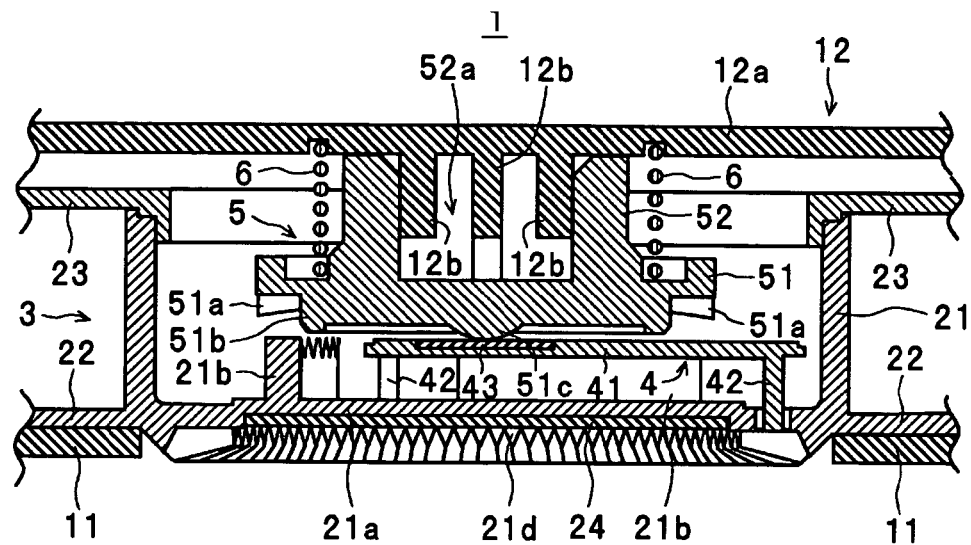
FIG. 8 is a cross-sectional view of the tape cartridge when it is used.

In contrast, when the tape cartridge 1 is mounted on the mounting portion of the drive unit, the door member 7 is slid by the drive unit, thereby the tape drawing-out port 2a is opened. Next, when, for example, the mounting portion moves the tape cartridge 1 to the end portion of the drive shaft of the drive unit, the leg portions 42, 42, and 42 of the brake elimination plate 4 are pressed by the drive shaft (not shown) as shown in FIG. 8. As a result, the lock member 5 is pushed to the top plate 12a of the upper case 12 by the brake elimination plate 4 while being guided by the guide projections 12b, 12b, . . . of the upper case 12. In this state, the teeth portion 51a of the lock member 5 is disengaged from the teeth portions 21b of the hub 21 as well as the positioning projection 51b is disengaged from the tape reel 3 on the inner peripheral side of the teeth portions 21b, 21b, and 21b. Further, the drive teeth portion (not shown) formed to the end portion of the drive shaft is engaged with the teeth portions 21d of the hub 21 as well as the metal plate 24 of the tape reel 3 is attracted to the end portion of the drive shaft by magnetic force, thereby the tape reel 3 is chucked to the drive shaft.

Next, the drive unit draws out the magnetic tape wound around the tape reel 3 from the tape drawing-out port 2a to the outside of the case main body 2. Next, a tape reel on the drive unit side winds the magnetic tape as well as the drive shaft of the drive unit rotates at a rotation speed corresponding to a magnetic tape drawing-out speed, thereby the tape reel 3 is rotated. Subsequently, the recording/reproduction portion of the drive unit records and reproduces data to and from the magnetic tape. Next, on the completion of recording and reproduction of the data, the drive shaft is rotated in a direction where the magnetic tape is rewound, thereby the magnetic tape is rewound around the tape reel 3. In this case, since no thick wall portions such as a rib and the like are disposed on the inner peripheral surface of the hub 21 of the tape reel 3, the outer peripheral surface of the hub 21 is formed in a smooth state without irregularities due to shrinkage caused during production. Therefore, the magnetic tape can be rewound (wound) around the tape reel 3 without being deformed by irregularities.

Next, on the completion of rewind of the magnetic tape, the mounting portion separates the tape cartridge 1 from the end portion of the drive shaft. At the time, the lock member 5 urged by the spring 6 is moved to the bottom plate 21a of the hub 21 while pressing the brake elimination plate 4, and the positioning projection 51b of the lock member 5 is engaged with the tape reel 3 on the inner peripheral side of the teeth portions 21b, 21b, and 21b of the hub 21. Accordingly, the hub 21 and the lock member 5 are position with respect to each other. As shown in FIG. 9, the inclining surface 61 is formed to the end portion of the positioning projection 51b so as to gradually separate from the inner peripheral surfaces of the teeth portions 21b toward the end thereof. As a result, even if the hub 21 (tape reel 3) is decentered from the lock member 5, for example, the positioning projection 51b can be smoothly guided into the inside of the teeth portions 21b, 21b, and 21b by the inclining surface 61. Subsequently, the teeth portion 51a of the lock member 5 is engaged with the teeth portions 21b of the hub 21. In this case, since the hub 21 and the lock member 5 are positioned to each other securely by the engagement of the inner peripheral side surfaces of the teeth portions 21b, 21b, and 21b with the positioning projection 51b. With this arrangement, the rotation of the hub 21 (tape reel 3) is stopped likewise the state in which the tape cartridge 1 is not used, thereby the magnetic tape wound around the tape reel 3 can be securely prevented from being loosened.

As described above, according to the tape cartridge 1, the lock member 5 is composed of the positioning projection 51b which is engaged with the tape reel 3 on the inner peripheral side of the teeth portions 21b, 21b, and 21b in the state in which the teeth portions 21b of the hub 21 of the tape reel 3 are engaged with the teeth portion 51a of the lock member 5. Accordingly, when the teeth portions 21b are engaged with the teeth portion 51a, the tape reel 3 and the lock member 5 can be securely positioned, thereby the teeth portions 21b can be securely engaged with the teeth portion 51a. Further, when the tape cartridge 1 is not used, since the relative misalignment between the tape reel 3 and the lock member 5 can be securely prevented, even if external force is applied to, for example, the tape cartridge 1, the teeth portions 21b and the teeth portion 51a can be kept in a securely engaged state. Further, no rib is provided on the inner peripheral surface of the hub 21 different from the conventional magnetic tape cartridge, when the hub 21 (tape reel 3) is manufactured by, for example, injection molding, the outer peripheral surface thereof can be smoothly formed without causing irregularities due to shrinkage. Accordingly, the rotation of the tape reel 3 can be securely stopped without deforming the magnetic tape by the irregularities on the outer peripheral surface of the hub 21.

Further, the outer peripheral surface of the positioning projection 51b at the end portion thereof is formed of the inclining surface 61 which gradually separates from the inner peripheral side surfaces of the teeth portions 21b toward the end thereof. Accordingly, when the lock member 5 is moved toward the bottom plate 21a of the hub 21, even if the tape reel 3, for example, is decentered from the lock member 5, the positioning projection 51b can be smoothly guided into the inside of the teeth portions 21b, 21b, and 21b (the cylindrical interspace surrounded by the teeth portions 21b, 21b, and 21b) by the inclining surface 61. Accordingly, it can be securely prevented that the end portion of the positioning projection 51b is collided against the teeth portions 21b and both of them are broken.

Further, since the positioning projection 51b is formed on the inner peripheral side of the lock member 5, even if the lock member 5, for example, inclines with respect to the tape reel 3, the positioning projection 51b is unlike to come into contact with the teeth tip of the teeth portions 21b of the tape reel 3. Accordingly, noise, which is caused by the positioning projection 51b in contact with the teeth tip of the teeth portions 21b, and the wear of them can be securely prevented.

Figure 10:
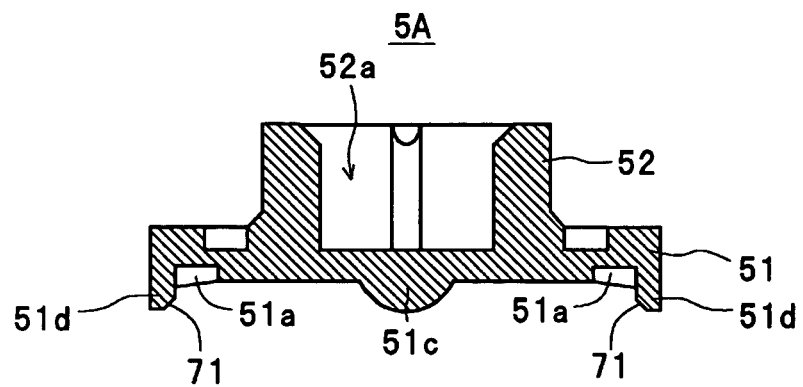
FIG. 10 is a cross-sectional view of another lock member.
Figure 11:
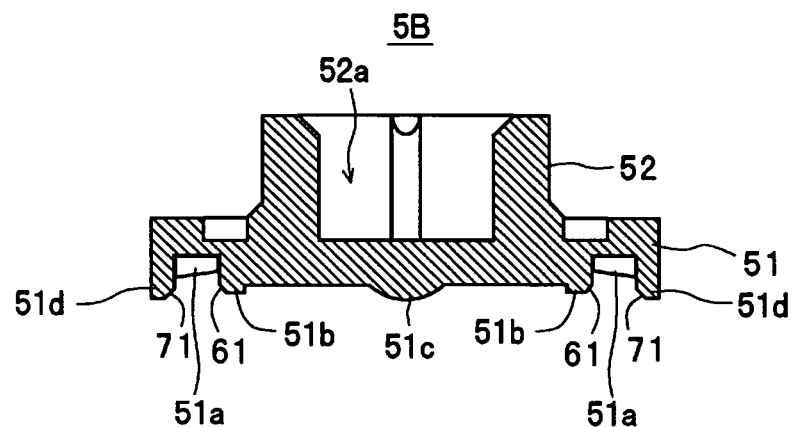
FIG. 11 is a cross-sectional view of still another lock member.

It should be note that the present invention is by no means limited to the above arrangement. The example, in which the positioning projection 51b is formed on, for example, the inner peripheral side of the main body 51 of the lock member 5, has been described above. However, as shown in FIG. 10, it is also possible to employ a lock member 5A having an annular positioning projection 51d (corresponding to the outer peripheral projection formed to the outer peripheral side of the second teeth portion of the present invention) formed on the outer peripheral side of a main body 51. In this case, an inclining surface 71, which has the same function as that of the inclining surface 61 of the positioning projection 51b of the lock member 5, is formed to the positioning projection 51d of the lock member 5A. It should be noted, in FIGS. 10 and 11, the components having the same functions as those of the components of the lock member 5 described above are denoted by the same reference numerals, and the duplicate explanation thereof is omitted. Further, as shown in FIG. 11, there can be also employed a lock member 5B which has a positioning projection 51b formed to the inner peripheral side of a main body 51 and a positioning projection 51d formed to the outer peripheral side of the main body 51. In this case, the rotation of a tape reel 3 can be securely stopped without deforming a magnetic tape even in a tape cartridge (information recording medium) having the lock member 5A or the lock member 5B likewise the tape cartridge 1.

Figure 12:
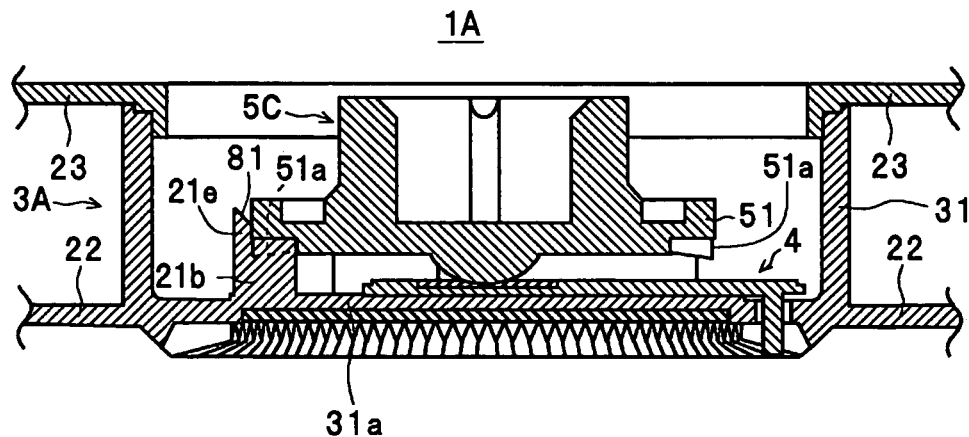
FIG. 12 is a cross-sectional view of another tape cartridge.
Figure 13:
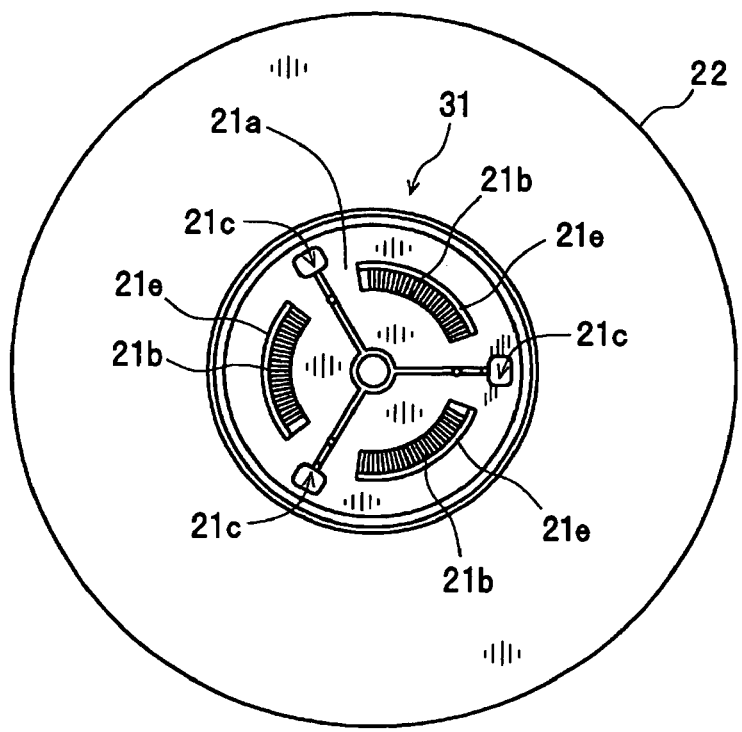
FIG. 13 is a plan view of another hub and another lower flange.
Figure 14:
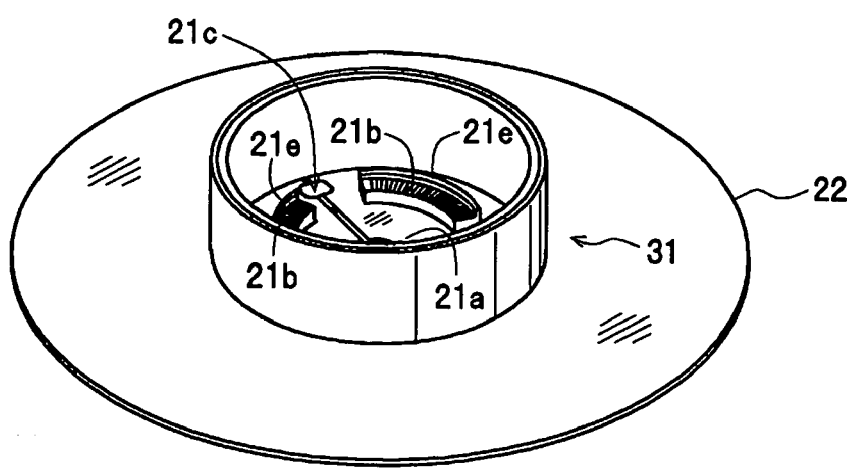
FIG. 14 is a perspective view of the another hub and the another lower flange.

Further, a tape cartridge 1A shown in FIG. 12 may be employed. It should be noted that, in FIGS. 12 to 18, the components having the same functions as those of the components of the tape cartridge 1 described above are denoted by the same reference numerals, and the duplicate explanation thereof is omitted. As shown in FIGS. 12 to 14, the tape cartridge 1A has a tape reel 3A and a lock member 5C to which the positioning projection 51b and the positioning projection 51d described above are not formed as shown in FIG. 12. The tape reel 3A has a hub 31 in which positioning projections 21e, 21e, and 21e each formed in an arc thin plate shape when viewed in a plane (corresponding to outer peripheral projections formed to the outer peripheral side of the first teeth portion of the present invention) are formed along the outer peripheral edges of respective teeth portions 21b, 21b, and 21b. In this case, the positioning projections 21e have a projecting length prescribed longer than the teeth height of the teeth portions 21b. That is, as shown in the FIG. 12, the positioning projections 21e are prescribed to project toward the opening of the hub 31 beyond the tips of the teeth portions 21b in the state in which the teeth portions 21b are engaged with the teeth portion 51a of the lock member 5C. Further, the radius of curvature and the like of the positioning projections 21e are prescribed such that they are engaged with the lock member 5C on the outer peripheral side of the teeth portion 51a in the state in which the teeth portions 21b are engaged with the teeth portion 51a. Further, each of the positioning projections 21e is formed of an inclining surface 81 having a linear cross sectional shape so that the inner peripheral surface (surface confronting the outer peripheral side surface of the second teeth portion of the present invention) at the end portion thereof is gradually separated from the side surface (outer peripheral surface) of the lock member 5C toward the end portion thereof. In this case, the end portion of each positioning projections 21e is not limited to the linear sectional shape, and each positioning projection 21e may be formed of a curved sectional shape or a sectional shape formed by combining a curve and a straight line.

In the tape cartridge 1A, when the teeth portions 21b are engaged with the teeth portion 51a, the positioning projections 21e are engaged with the lock member 5C on the outer peripheral side of the teeth portion 51a. Accordingly, since the tape reel 3A and the lock member 5C can be securely positioned, the teeth portions 21b can be securely engaged with the teeth portion 51a. Further, when the tape cartridge 1A is not used, since the positioning projections 21e are engaged with the lock member 5C, the relative misalignment between the tape reel 3A and the lock member 5C can be securely prevented. As a result, even if external force is applied to, for example, the tape cartridge 1A, the teeth portions 21b and the teeth portion 51a can be kept in a securely engaged state. Further, since the inner peripheral surface of hub 31 is provided with no rib different from the conventional magnetic tape cartridge, the outer peripheral surface of the hub 31 can be smoothly formed. Accordingly, the rotation of a tape reel 3A can be securely stopped without deforming a magnetic tape by the irregularities on the outer peripheral surface of the hub 31. Further, since the end portion of each positioning projection 21e is formed of the inclining surface 81, even if, for example, the tape reel 3A is decentered from the lock member 5C when the lock member 5 is moved toward the bottom plate 31a of the hub 31, it can be securely prevented that the end portions of the positioning projections 21e are collided against the teeth portion 51a and both of them are broken.

Figure 15:
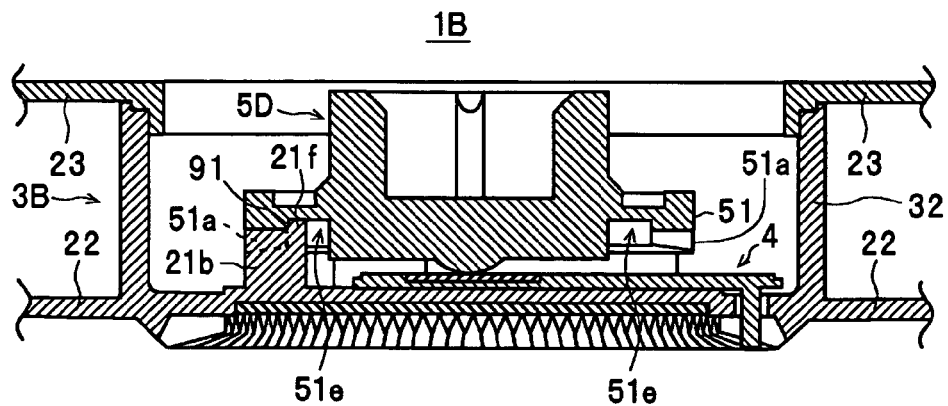
FIG. 15 is a cross-sectional view of still another tape cartridge.

Further, a tape cartridge 1B shown in FIG. 15 may be employed. As shown in FIG. 15, the tape cartridge 1B has a tape reel 3B and a lock member 5D. The tape reel 3B has a hub 32 including positioning projections 21f, 21f, and 21f each formed along the inner peripheral edges of respective teeth portions 21b, 21b, and 21b in an arc thin plate shape when viewed in a plane (corresponding to inner peripheral projections of the first teeth portion of the present invention). The lock member 5D has a recess 51e formed to the inner peripheral side of a teeth portion 51a in an annular shape when viewed in a plane. In this case, the positioning projections 21f are prescribed to project toward the opening of the hub 32 beyond the teeth tips of the teeth portions 21b in the state in which the teeth portions 21b are engaged with the teeth portion 51a of the lock member 5D. Further, the radius of curvature and the like of the positioning projections 21f are prescribed such that they are engaged with the recess 51e of the lock member 5D (that is, with the lock member 5D on the inner peripheral side surface of the teeth portion 51a) in the state in which the teeth portions 21b are engaged with the teeth portion 51a. Further, as shown in FIG. 15, an inclining surface 91 having the same function as that of the inclining surface 81 is formed to each of the positioning projections 21f. The rotation of the tape reel 3B can be securely stopped without deforming a magnetic tape also in the tape cartridge 1B likewise the tape cartridge 1A as well as it can be securely prevented that the end portions of the positioning projections 21f are collided against the teeth tip of the teeth portion 51a and both of them are broken.

Figure 16:
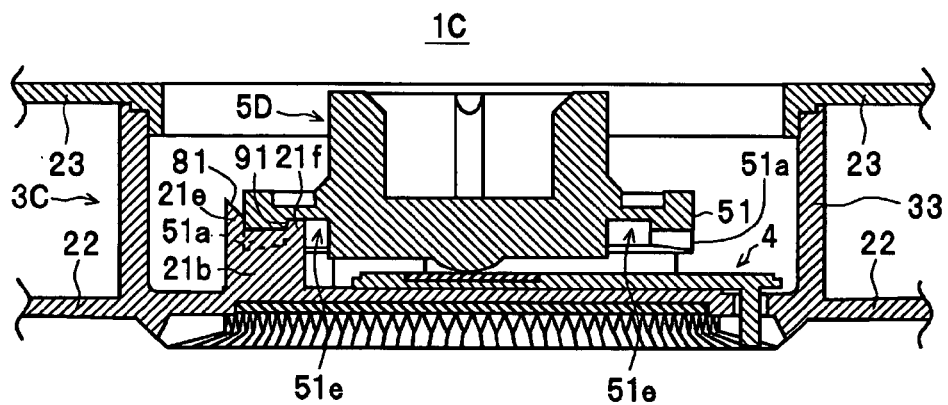
FIG. 16 is a cross-sectional view of a further tape cartridge.

Further, as shown in FIG. 16, there may be also employed a tape cartridge 1C which has a tape reel 3C including a hub 33 and the above lock member 3D. The hub 33 includes both the above positioning projections 21e, 21e, and 21e and the above positioning projections 21f, 21f, and 21f formed thereto. The rotation of a tape reel 3C can be securely stopped without deforming a magnetic tape also in the tape cartridge 1C likewise the tape cartridges 1A and 1B as well as it can be securely prevented that the end portions of the positioning projections 21e and 21f are collided against the teeth tip of the teeth portion 51a and both of them are broken.

Figure 17:
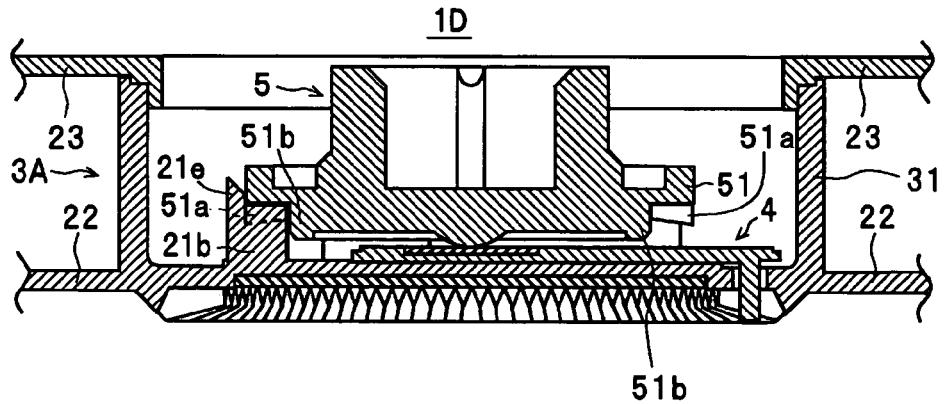
FIG. 17 is a cross-sectional view of a still further tape cartridge.
Figure 18:
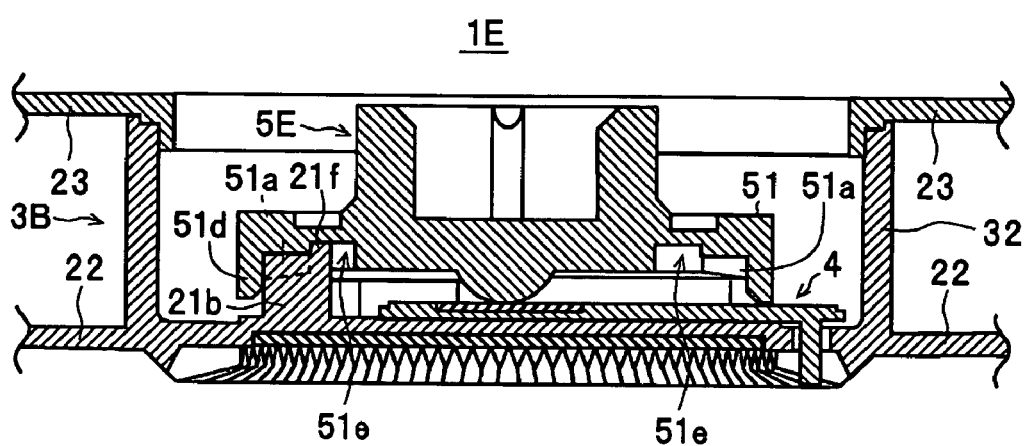
FIG. 18 is a cross-sectional view of a yet still further tape cartridge.

Further, as shown in FIG. 17, there may be employed a tape cartridge 1D which has the above tape reel 3A including the hub 31, to which the positioning projections 21e, 21e, and 21e are formed, and the above lock member 5 to which the positioning projection 51b is formed. Furthermore, as shown in FIG. 18, there may be also employed a tape cartridge 1E which has the above tape reel 3B including the hub 32, to which the positioning projections 21f, 21f, and 21f are formed, and a lock member 5E to which both the above positioning projection 51d and the above recess 51e are formed. The rotation of the tape reel 3A and the tape reel 3B can be securely stopped without deforming a magnetic tape also in the tape cartridges 1D and 1E likewise the tape cartridges 1 and 1A to 1C as well as the breakage of the positioning projections 51b and 51d and the teeth tip of the teeth portions 21b caused by the collision thereof and the breakage of the positioning projections 21e and 21f and the teeth tip of the teeth portion 51a caused by the collision thereof can be securely prevented.

What is claimed is:

1. A cartridge case comprising:
   a case main body;
   a tape reel having a cylindrical bottomed hub, which includes a first teeth portion formed to an inner surface of a bottom plate thereof in an annular or arc shape when viewed in a plane, and rotatably accommodated in the case main body; and
   a non-rotatable lock member including a second teeth portion, which is formed on a bottom portion thereof in an annular shape when viewed in a plane and is engaged with the first teeth portion to restrain the rotation of the tape reel, and is accommodated in the case main body so as to be urged to the bottom plate and to move along a direction where it becomes close to and separates from the bottom plate to thereby restrain the rotation of the tape reel and allow rotation of the tape reel, respectively,
   wherein the lock member comprises at least one of an inner peripheral projection, which is formed to an inner peripheral side of the second teeth portion, projects toward the bottom plate beyond a teeth tip of the second teeth portion, and is engaged with the tape reel so as to contact the inner peripheral side of the first teeth portion when the first teeth portion is engaged with the second teeth portion, and an outer peripheral projection which is formed to an outer peripheral side of the second teeth portion, projects toward the bottom plate beyond a teeth tip of the second teeth portion, and is engaged with the tape reel so as to contact the outer peripheral side of the first teeth portion in the above engaged state, and
   wherein the at least one of the inner peripheral projection and outer peripheral projection has a projecting length that projects toward the bottom plate beyond the teeth tip of the second teeth portion, the projecting length being longer than teeth height of the second teeth portion.

2. A cartridge case according to claim 1,
   wherein an end portion of at least one of the projections comprises an inclined portion that is formed such that a surface thereof confronting an inner side surface or an outer side surface of the first teeth portion separates from a side surface toward an end of the surface in the above engaged state.

3. A cartridge case according to claim 1, wherein the lock member comprises only the inner peripheral projection out of the inner peripheral projection and the outer peripheral projection.

4. An information recording medium comprising the cartridge case according to claim 1.

* * * * *